United States Patent [19]

Hamada

[11] Patent Number: 5,234,734

[45] Date of Patent: Aug. 10, 1993

[54] TRANSFER SHEET

[76] Inventor: Hideo Hamada, 15-401, Kawanaka-Shinmachi, Diato-Shi, Osaka 574, Japan

[21] Appl. No.: 769,681

[22] Filed: Oct. 2, 1991

[30] Foreign Application Priority Data

Oct. 5, 1990 [JP] Japan .................. 2-268746

[51] Int. Cl.$^5$ ............................. A61F 13/02
[52] U.S. Cl. ...................... 428/40; 428/191; 428/198; 428/200; 428/350; 428/355; 428/913; 428/914
[58] Field of Search ............ 428/40, 350, 355, 914, 428/913, 191, 198, 200; 427/146, 208.6, 209, 210

[56] References Cited

U.S. PATENT DOCUMENTS

| | | | |
|---|---|---|---|
| 1,619,081 | 3/1927 | McLaurin | 428/191 |
| 3,413,168 | 11/1968 | Danielson et al. | 156/71 |
| 3,730,825 | 5/1973 | Nakane | 428/350 |
| 4,175,156 | 11/1979 | Ikins | 428/336 |
| 4,440,821 | 4/1984 | Komura | 427/208.6 |
| 4,460,634 | 7/1984 | Hasegawa | 427/208.6 |

FOREIGN PATENT DOCUMENTS

| | | |
|---|---|---|
| 0196749 | 10/1986 | European Pat. Off. . |
| 0372080 | 6/1990 | European Pat. Off. . |
| 51-6235 | 1/1976 | Japan . |
| 61-66631 | 4/1986 | Japan . |
| 63-10680 | 1/1988 | Japan . |
| 1552232 | 9/1979 | United Kingdom . |

Primary Examiner—George F. Lesmes
Assistant Examiner—Nasser Ahmad
Attorney, Agent, or Firm—Armstrong, Westerman, Hattori, McLeland & Naughton

[57] ABSTRACT

This invention provides a transfer sheet comprising a release sheet, a sticker layer disposed on the releasable side of the release sheet, a main transfer layer superposed on the sticker layer, the sticker layer consisting of a non-adhesive resin layer in the form of a grating and an adhesive resin layer disposed in interstices of the grating.

4 Claims, 2 Drawing Sheets

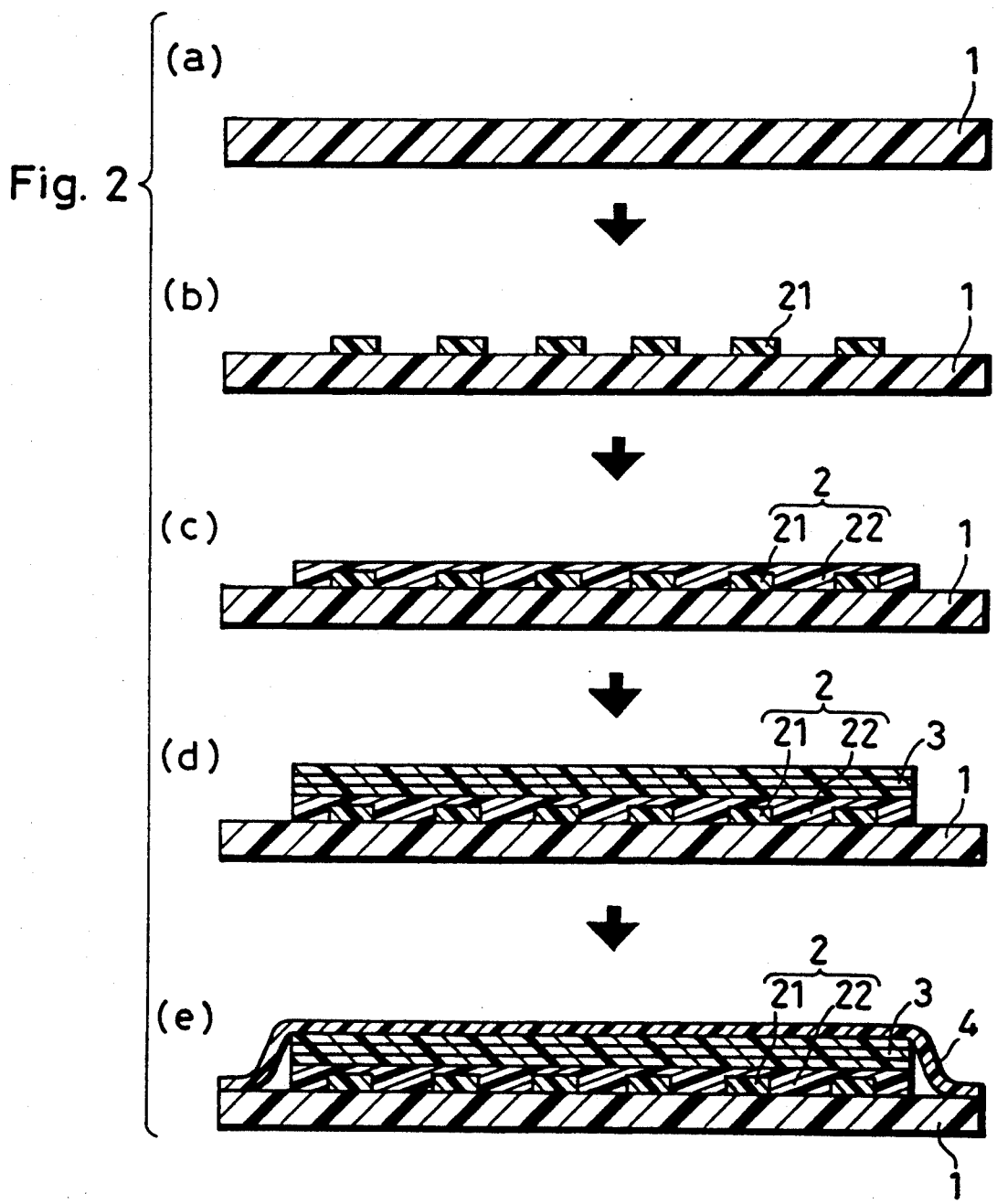

TRANSFER SHEET

FIELD OF THE INVENTION

The present invention relates to a transfer sheet with which a pattern can be transferred to a substrate surface. More particularly, the invention relates to a transfer sheet which insures adequate stickiness on application and a permanent bond in due course.

BACKGROUND OF THE INVENTION

A transfer sheet having a pressure-responsive adhesive layer offers the advantage of good workability in that it can be easily applied to a substrate surface but has several disadvantages. Thus, because of the very nature of a pressure-responsive adhesive agent, the bond strength that can be attained is limited; offset tends to take place after application to the substrate surface, re-application is difficult, and air is liable to be entrapped and the entrapped air can hardly be driven out.

On the other hand, a transfer sheet having a regular adhesive layer insures a permanent bond but in order that a sufficient bond strength may be insured, subsequent drying and heating are essential. Moreover, in application to the substrate surface, a pressure must at any rate be applied for a time period which is not brief. Therefore, the sheet is not satisfactory in workability.

The foregoing suggests that if a stick-adhesive composition that would undergo spontaneous transition from a pressure-responsive adhesive to an adhesive after application to any substrate should ever be developed, both the demand for ease of application and the demand for permanent adhesion could be successfully reconciled.

Much research has been undertaken into stick-adhesive agents. By way of illustration, Japanese Kokai Patent Application No. 63-10680 discloses a stick-adhesive composition comprising a monofunctional acrylic monomer, a compound containing two or more acryloyl groups, a compound containing two or more epoxy groups and a masked epoxy curing agent.

Japanese Kokai Patent Application No. 51-6235 discloses a stick-adhesive composition comprising a mixture of n-butyl acrylate and 2-ethylhexyl acrylate, a functional vinyl monomer and a vinyl monomer copolymerizable therewith.

Furthermore, Japanese Kokai Patent Application No. 61-66631 describes a continuous lapping method for cladding a piece of furniture or an architectural member with a decorative sheet employing a urethane prepolymer stick-adhesive composition which comprises paying out an endless decorative sheet from a roll, applying said stick-adhesive composition to the reverse side of said decorative sheet in the course of its travel, drying the same and applying the sheet to the furniture or architectural member through a roll assembly adapted to compress the sheet against said member in register with the surface configuration of the latter. The stick-adhesive composition employed in this prior art method develops a pressure-sticking power necessary for application within 8 hours after evaporation of the coating solvent and, thereafter, manifests an adhesive property as the curing reaction proceeds in line with progressive absorption of moisture with or without the aid of a curing component.

However, the stick-adhesive composition proposed in Japanese Kokai Patent Application No. 63-10680 has the disadvantage that heating is required for conversion from a sticking agent to a bonding agent. The stick-adhesive composition described in Japanese Kokai Patent Application No. 51-6235 is also disadvantageous in that thermal curing is required after application to the substrate. This need for a post-heating procedure for said conversion from a sticking agent to an adhesive agent is not only an economic deterrent, because this requires additional work after application, but a serious limiting factor in the utility of the composition because it cannot be utilized in applications where heat is abhorred or in the field of transfer printing sheets which are to remain on the substrates.

The stick-adhesive composition according to Japanese Kokai Patent Application No. 61-66631 is subject to the time limit that its pressure adhesive property is available only up to 8 hours after evaporation of the coating solvent. Moreover, it can never be used for transfer sheets which are marketed in the condition preformed with a stick-adhesive layer.

It is, therefore, an object of the present invention to provide a transfer sheet with which a final product can be marketed as carrying a sticker layer and applied to a substrate surface by simple pressing as it is the case with the conventional pressure-responsive adhesive and which permits re-application for correction, does not allow entrapment of air and, after application, insures a permanent bond after a certain time period.

SUMMARY OF THE INVENTION

The transfer sheet of the present invention comprises a release sheet 1 and a main transfer layer 3 disposed on a release surface of said release sheet 1 through a sticker layer 2 interposed therebetween, said sticker layer 2 consisting of a non-adhesive resin layer 21 in the form of a grating and an adhesive resin layer 22 disposed within interstices of said grating.

BRIEF DESCRIPTION OF THE DRAWINGS

FIG. 2 is a schematic sectional view showing another example of the method for constructing a transfer sheet in accordance with the present invention.

DETAILED DESCRIPTION OF THE PREFERRED EMBODIMENT

Figure 1:
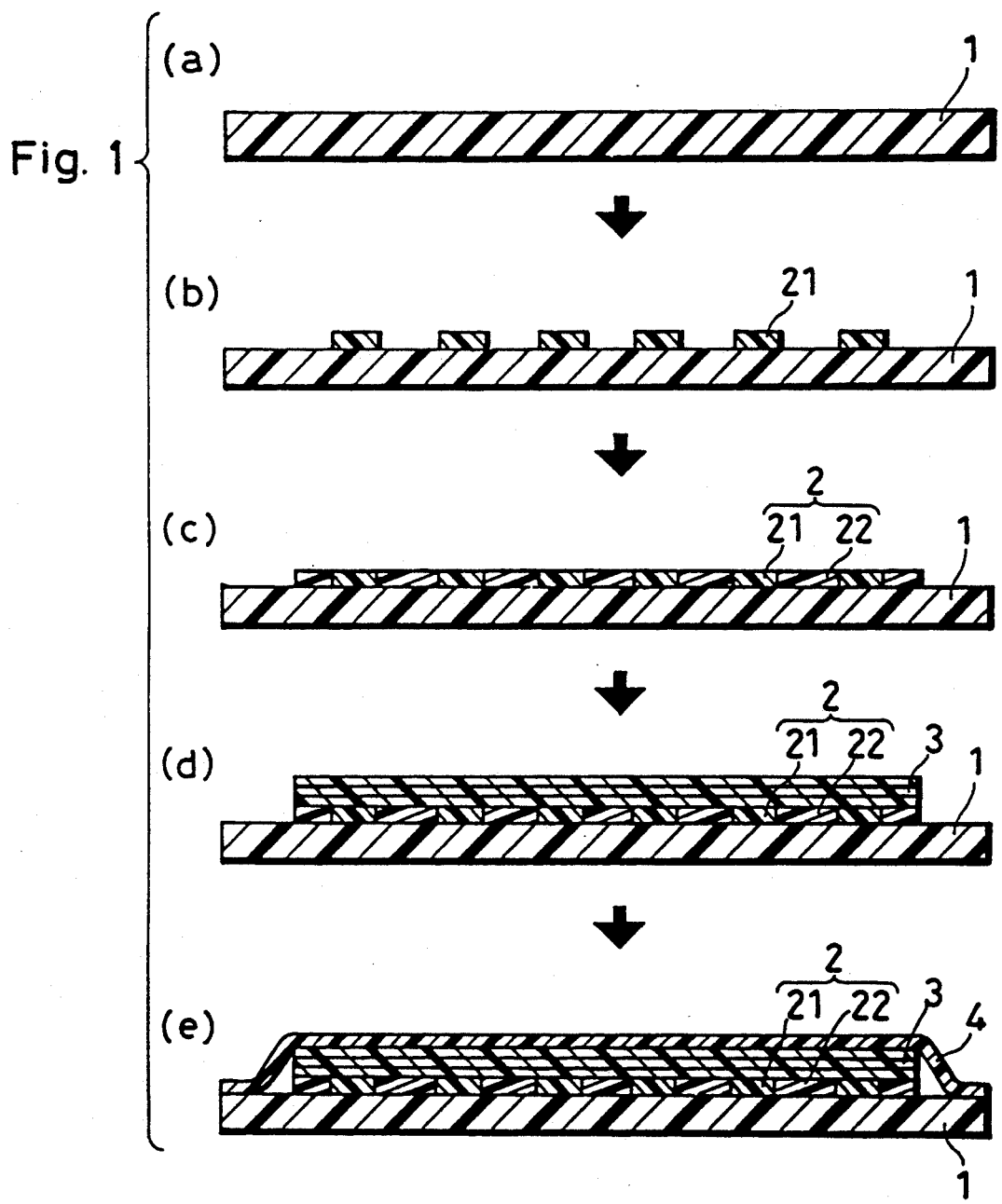
FIG. 1 is a schematic sectional view showing an example of the method for constructing a transfer sheet in accordance with the present invention.

The release sheet 1 mentioned above is preferably a plastic sheet, the surface or surfaces of which have been treated with a release agent. Where moisture resistance is not required, a sheet of paper treated with such a release agent can also be employed. The release agent includes, among others, long-chain alkyl acrylate copolymers, long-chain alkyl vinyl ester compolymers, long-chain alkyl vinyl ether copolymers, alkyl allyl ester copolymers, maleic acid long-chain alkyl derivative copolymers, long-chain alkyl ester polymers, long-chain alkyl carbamate-modified polymers, polyethyleneimine derivatives, perfluoroalkyl-containing compounds (inclusive of fluororesin), silicones, fluororesins, paraffins and so on. Particularly useful for practical purposes are silicones. Aside from the foregoing, sheets made of release materials or sheets in which a release agent has been internally added during manufacture can likewise be employed.

Disposed on the releasable surface of said release sheet 1 is a sticker layer 2. This sticker layer 2 in the transfer sheet of the invention consists of a non-adhesive resin layer 21 in the form of a grating and an adhesive resin layer 22 disposed in interstices of said grating.

The non-adhesive resin layer 21 may be a layer that may be formed from any of various resins such as acrylic resin, urethane resin, polyester resin, polyvinyl chloride resin and so on. This layer 21 can be formed by various techniques such as solvent evaporation, thermal curing, reaction-curing, curing with a catalyst, ultraviolet curing, moisture curing, etc. but the layer so formed must be non-adhesive. This non-adhesive resin layer 21 is formed in the form of a grating on the releasable surface of the release sheet 1. The grating may be of any desired configuration, such as hexagonal-mesh, orthogonal-mesh, oblique-mesh, irregular-mesh, meshes left behind after punching out circles, parallel-line, parallel-wave and so on.

The adhesive resin layer 22 may be any of the varieties of resin layers which exhibit adhesion to the substrate surface. Particularly useful are a pressure-responsive adhesive resin layer (X) or a moisture-curing adhesive resin layer (Y). However, in order to insure an adequate degree of initial tackiness at application and a subsequent permanent bond with lapse of time after application, the adhesive resin layer 22 is preferably made of a stick-adhesive resin composition layer (XY) comprising a pressure-responsive adhesive resin (x) and a moisture-curing adhesive resin (y) in a weight ratio of 90:10 through 5:95 on a nonvolatile matter basis. Such a composition is now described in detail.

The pressure-responsive adhesive resin (x) includes, among others, acrylic, silicone, rubber, vinyl, urethane and ultraviolet pressure-responsive adhesive resins. Particularly useful are acrylic pressure-responsive adhesive resins. Such an acrylic pressure-responsive adhesive resin can be prepared by copolymerizing a soft segment component consisting in an alkyl($C_{about\ 4\sim 12}$) (meth)acrylate such as butyl acrylate, 2-ethylhexyl acrylate or the like with a hard segment component consisting of a short-chain alkyl (meth)acrylate, vinyl acetate or the like in appropriate proportions. In some cases, a small proportion of a functional group-containing monomer may be copolymerized.

Depending on the kind of pressure-responsive adhesive resin (x), a tackifying agent and/or a softening agent may be used in combination. Moreover, a variety of additives such as an aging inhibitor, a filler, a vulcanizing agent, a crosslinking agent, a colorant, an antifoam, a leveling agent, etc. may also be incorporated in the pressure-responsive adhesive resin (x).

The moisture-curing adhesive resin (y) is preferably a resin for one-package NCO-terminated polyurethane adhesive compositions, for example the resins obtainable by reacting a polyisocyanate compound such as tolylene diisocyanate, diphenylmethane diisocyanate or the like with a polyol such as a polyether polyol (e.g. polyoxypropylenediol, polytetramethylene glycol ether, polyoxyethylene diol, etc.) or a polyester polyol (e.g. polyethylene adipate, polybutylene adipate, polyhexamethylene adipate, polycaprolactone, etc.). The above resin may have a urethane bond in the intermediate region of its molecule. Aside from the above-mentioned resins, it is possible to employ a moisture-curing silicone resin or an acrylic resin containing a substance which is rendered basic by exposure to moisture.

The ratio of pressure-responsive adhesive resin (x) to moisture-curing adhesive resin (y) is within the range of 90:10 through 5:95 by weight. The preferred range is 80:20 through 10:90. An excess of pressure-responsive adhesive resin x) or a shortage of moisture-curing adhesive resin (y) results in failure to give a permanent bond. On the other hand, a shortage of pressure-responsive adhesive resin (x) or an excess of moisture-curing adhesive resin (y) results in the disadvantage that a prolonged press time is required in application.

It is preferable that, in the stick-adhesive resin composition layer (XY) formed from said composition, the moisture-curing adhesive resin (y) is present continually from one surface to the other of said layer (XY). Moreover, the pressure-responsive adhesive resin (x) is also preferably distributed continuously between the two surfaces of the layer (XY).

To insure that the moisture-curing adhesive resin (y) and/or pressure-responsive adhesive resin (x) will be distributed continually between both surfaces of the stick-adhesive resin composition layer (XY), it is important to use a special solvent system for the stick-adhesive resin composition.

Thus, the solvent system to be used in the preparation of the stick-adhesive resin composition is preferably a system consisting of at least two solvents each dissimilar in the solubility of the pressure-responsive adhesive resin (x) and moisture-curing adhesive resin (y) and such that one of the solvents in which the pressure-responsive adhesive resin (x) is more readily soluble than the moisture-curing adhesive resin (y) is evaporated in the first place after application and the other solvent in which the moisture-curing adhesive resin (y) is more readily soluble than the pressure-responsive adhesive resin (x) is evaporated in the second place.

In this arrangement, even if and when the pressure-responsive adhesive resin (x) is precipitated during preparation of the adhesive resin layer 22 or with the progress of subsequent drying, the moisture-curing adhesive resin (y) still remains in solution, with the result that the moisture-curing adhesive resin (y) and/or pressure-responsive adhesive resin (x) may be distributed continually from one surface to the other of the stick-adhesive resin composition layer (XY).

The solvents mentioned above can be selected from among, for example, hydrocarbons, esters, ethers, ketones, nitrogen-containing solvents, sulfur-containing solvents, halogenated solvents, and solvents containing two or more functional groups (e.g. ester and ether groups), and these solvents are used combinedly in suitable proportions.

Whether, in the stick-adhesive resin composition layer (XY), the moisture-curing adhesive resin (y) exists continually from one surface to the other of the layer or as an island or islands in the sea of pressure-responsive adhesive resin (x) can be ascertained by a variety of techniques. For example, the internal structure of the layer can be ascertained by staining the layer with a dye which shows divergent affinities for the pressure-responsive adhesive resin (x) and moisture-curing adhesive resin (y) and observing the stained section of the layer under a microscope or, alternatively, by treating the stick-adhesive resin composition layer (XY) after curing of its moisture-curing adhesive resin (y) with a solvent capable of dissolving the pressure-responsive adhesive resin (x) and examining the residual structure of the layer.

For the formation of the sticker layer 2 on the release surface of the release sheet 1, the non-adhesive resin layer 21 is first formed in a grate pattern on the release sheet 1 and the adhesive resin layer 22 filling up the interstices of the grating is then formed. In filling with said non-adhesive layer 22, the layer 22 may be formed only in the interstices of the grating of non-adhesive resin 21 [FIG. 1 (C)] or alternatively over the non-adhesive resin layer 21 as well as in the interstices of the grating [FIG. 2, (C)].

Disposed on the sticker layer 2 is a main transfer layer 3, over which is optionally disposed a protective sheet (4) as will be described hereinafter.

The transfer sheet according to the present invention may be a composite structure of said release sheet 1, sticker layer 2 and main transfer layer 3, which, for use, is cut or punched, or preferably a composite structure of said release sheet 1, said sticker layer 2 and main transfer layer 3, both of which may be formed by screen printing, and a protective sheet. The latter type of composite structure is now described in detail.

A typical procedure for the construction of the transfer layer of the present invention is as follows.

First, a sticker layer 2 is screen-printed on the releasable surface of a release sheet 1. For this pattern printing, said non-adhesive resin layer 21 is printed in the shape of a grating and, then, the adhesive resin layer 22 is printed so as to fill up interstices of the grating. For insuring the required thickness, the non-adhesive resin layer 21 and/or the adhesive resin layer 22 may be formed by a series of printing. There may be cases in which the formation of said non-adhesive resin layer 21 and adhesive resin layer 22 involves rejection of printing ink but, to prevent such rejection, it is good practice to incorporate a trace or small amount of a surface active substance, such as a silicone, in the resin solutions to be used for the formation of the respective layers.

Following formation of said sticker layer 2 on the release sheet 1 by pattern printing, one or more than one main transfer layer 3 is formed by screen printing in substantially the same pattern as the sticker layer 2. The ink which can be used for this purpose includes not only clear inks containing no colorants but also colored inks, ultraviolet-curing inks, electron beam-curing inks, functional (electrically conductive, temperature-indicating, fluorescent, light storage type, reflective, fragrant and magnetic) inks and so on. On top of this main transfer layer 3 or, as intermediate layers, a vapor-deposition layer, a plating layer, a foil transfer layer, etc. may also be provided.

When the above sticker layer 2 contains a moisture-curing adhesive layer (y), the stickiness of the layer may be lost on curing of the moisture-curing adhesive resin (y) in the event that moisture is available during storage or distribution. Therefore, after formation of the main transfer layer 3, a moisture-proof protective sheet 4 larger than the pattern area of the main transfer layer is disposed on the transfer layer. In consideration of transfer workability, the protective sheet 4 is generally a sheet which is only weakly sticky to the main transfer layer so that it can be easily peeled off before the transfer operation.

The protective sheet 4 is advantageously a film or sheet made of a polyolefin, polyvinyl chloride, polyester, polyamide, polyurethane, polyimide, cellulose derivative, polyacetal or the like and coated either thoroughly or partially with a coating agent imparting a mild degree of sticking property depending on the intended application. It is also possible to use a plurality of protective sheets in superimposition so as to impart added body to the whole sheet. The protective sheet may also be formed by printing.

When a moisture-proof sheet is used as said release sheet 1 and, also, as said protective sheet 4, the aforementioned sticker layer 2 and main transfer layer 3 sandwiched between the release sheet 1 and the protective sheet 4 are protected against moisture.

The transfer printing sheet described above has a laminar configuration of 1/2/3/4 and it is a usual practice to construct the layers starting with 1. It is only necessary that this laminar configuration be finally formed; the layer formation order is not restricted to any specific one.

For example, an alternative sequence comprises forming the main transfer layer 3 on the protective sheet 4 in the first place, then forming the sticker layer 2 on the main transfer layer 3 and finally disposing the release sheet 1 on top of the sticker layer 2.

To facilitate the transfer process, the bonding strength between the release sheet 1 and sticker layer 2 is set to a lowest value, that between the main transfer layer 3 and protective sheet 4 to an intermediate value and that between the sticker layer 2 and the substrate to a highest value.

Since the sticker layer 2 is sticky, the substrate may be optional in kind. Thus, the substrate includes organic and inorganic materials such as metals, plastics, rubbers, coated surfaces, wood, bamboo, ceramics, paper, woven fabrics, nonwoven fabrics, leather, porcelains and so on.

The transfer procedure is as follows. First, the protective sheet 4 is released with fingers or a jig and the laminated structure consisting of the sticker layer 2, main transfer layer 3 and protective sheet 4 is removed from the release sheet 1. Then, the sticker layer 2 of the laminated structure is pressed against a substrate and the protective layer 4 alone is peeled off.

In the transfer sheet of the present invention, the sticker layer 2 consists of a non-adhesive resin layer 21 in the pattern of a grating and an adhesive resin layer 22 disposed in interstices of the grate pattern of the non-adhesive resin layer 21.

Of these component layers, the non-adhesive resin layer 21 contacts the substrate when applied thereto but does not stick to the latter and, as such, serves to provide access to air. Since the non-adhesive resin layer 21 is grating-configured, the air may pass from and into the interior even when the application area is large.

On the other hand, the adhesive layer 22 is sticky so that the transfer piece consisting of the sticker layer 2 and main transfer layer 3 can be stuck in one operation to a variety of substrates, irrespective of materials.

When the adhesive resin layer 22 of the sticker layer 2 is a pressure-responsive adhesive resin layer (X) (Case 1), the aforesaid grating-configured non-adhesive resin layer serves not only for air bleeding in application but also as a modulator of stickiness.

When the adhesive resin layer 22 of the sticker layer 2 is a moisture-curing adhesive resin layer (Y) (Case 2), the aforesaid non-adhesive resin layer 21 in the form of a grating not only serves as an air bleeding means but also provides access to moisture necessary for rapid curing of the moisture-curing adhesive resin layer (Y).

Where the adhesive resin layer 22 of the sticker layer 2 is a stick-adhesive resin composition layer (XY) composed of a pressure-responsive adhesive resin (x) and a moisture-curing adhesive resin (y) (Case 3), the above non-adhesive resin layer 21 in the form of a grating serves as an air bleeding means in application, plays the role of viscosity modulation for re-application and serves as access to moisture necessary for timely curing of the moisture-curing adhesive resin layer (Y).

In Case 2 or Case 3, the adhesive resin layer 22 of the sticker layer 2 is exposed to air in application to the substrate and, thereafter, begins to cure in situ on the substrate and undergoes rapid curing by the moisture contained in the air supplied via the grating-shaped non-adhesive resin layer 21.

In Case 3, the pressure-responsive adhesive resin (x) plays the role of a sticker in an initial phase after application and, then, the moisture-curing adhesive resin (y) plays the role of an adhesive. Furthermore, since the pressure-responsive adhesive resin (x) has already secured an intimate contact of the layer with the substrate by the time the moisture-curing adhesive resin (y) plays its role, adhesion takes place under intimate contact. In addition, while the moisture-curing adhesive resin (y) as such is inherently not sufficient in low-temperature impact resistance, the presence of the pressure-responsive adhesive resin (x) makes up for this deficiency in impact resistance at low temperature.

Particularly in Case 3, where the moisture-curing resin (y) is continually present from one surface to the other of the adhesive resin layer 22 of the sticker layer 2, the respective beneficial properties of the pressure-responsive adhesive resin (x) and moisture-curing adhesive resin (y) are fully exploited without mutual cancellation and, with the progress of curing, a tough permanent bond is obtained between the substrate and the main transfer layer 3 through the sticker layer 2, thus providing a very effective transfer sheet.

The release sheet 1 serves to peelably support a transfer piece consisting of the sticker layer 2 and the main transfer layer 3.

The main transfer layer 3 imparts the necessary labeling or function to the substrate.

The protective sheet 4 facilitates the transfer to the substrate and, in Case 2 or 3, serves to effectively prevent spontaneous curing of the moisture-curing adhesive resin (y) prior to use. When a moisture-impermeable sheet such as a polyester sheet is used as said release sheet 1 and a similarly moisture-impermeable sheet is used as said protective sheet 4, too, curing of the moisture-curing adhesive resin (y) in Case 2 or 3 can be prevented for several months to more than a year.

The following examples are further illustrative of the invention. Hereinafter, all parts and % are by weight.

EXAMPLE 1

FIG. 1 is a schematic sectional view showing an exemplary method of constructing a transfer sheet of the invention.

A 125 μm-thick polyester release sheet 1 one side of which has been treated with silicone was provided.

The releasable surface of the release sheet 1 is coated with a solution of a two-package acrylic urethane curing resin in toluene-methyl ethyl ketone by screen printing, followed by drying to cure and form a non-adhesive resin layer 21 having a fine mesh pattern, 2 mm² and a line width of 0.4 mm.

On the other hand, a pressure-responsive adhesive resin (x) solution (solvent: ethyl acetate-toluene) containing 40% of a n-butyl acrylate-vinyl acetate (7:3 by weight) copolymer resin and having a viscosity of 5,000 cps/25° C. was mixed with an urethane moisture-curing adhesive resin (y) solution (solvent: ethyl acetate-toluene) having a resin content of 50% and a viscosity of 1,000 cps/25° C. in a weight ratio of 65:35 to make 100 parts. Furthermore, this mixture was diluted with 50 parts of a solvent mixture consisting of 70% of diethylene glycol ethyl ether acetate, which is a good solvent for both the pressure-responsive adhesive resin(x) and moisture-curing adhesive resin (y) and 30% of dimethyl sulfoxide, which is a good solvent for said moisture-curing adhesive resin (y) but a poor solvent for said pressure-responsive adhesive resin (x) to provide a composition.

This composition was then screen-printed over the pattern of non-adhesive resin layer 21 formed above, in a fine pattern corresponding to the interstices of said non-adhesive resin layer 21 grating and in an overall pattern which is globally identical with the first-mentioned pattern, followed by preliminary drying.

In this manner, a sticker layer 2 having an adhesive resin layer 22 filled in the grating interstices of the non-adhesive resin layer 21 is obtained.

Then, over this sticker layer 2 and in perfect register with its pattern, a main transfer layer 3 was constructed by screen-printing a plurality of ink layers, such as a clear ink layer and a colored ink layer, followed by sufficient drying in a dryer.

Then, over the main transfer layer 3, a protective sheet 4 comprising a polyvinyl chloride film having a weakly adhesive layer was superposed and the assembly was passed between a pair of rubber rollers. Then, for reinforcement, another protective sheet of the same type was superposed and pressed.

The above procedure provided a transfer sheet having the 1/2/3/4 construction. A half cut was then made between the patterns from the protective sheet 4 side.

With one end of the protective sheet 4 of the transfer sheet thus obtained with fingers, the laminate of sticker layer 2/main transfer layer 3/protective sheet 4 was peeled off from the release sheet 1. Then, the sticker layer 2 side of the laminate was applied against the substrate surface and pressed a few times with the fingers. Then, the protective sheet 4 was gently peeled off, whereupon the pattern comprising the 2/3 transfer layer only was left behind on the substrate. Thus, the transfer operation could be completed in a simple manner. The air entrapped at application was readily driven out. Moreover, in an early period following application, re-application could also be easily performed.

The aging characteristics were investigated using a variety of substrates subjected to the above transfer operation.

Thus, the substrates subjected to the transfer operation were allowed to stand in a room and serially subjected to a peeling test, 5 sheets a time. The results are set forth in Table 1.

TABLE 1

| Substrate | Time (days) | Peeling strength (g/5 mm) |
|---|---|---|
| Stainless steel sheet | Immediately after application | 300 |
|  | 1 | 410 |
|  | 3 | 490 |
|  | 7 | 530 |
|  | 14 | 530 |
| Polyester sheet | Immediately after application | 330 |
|  | 1 | 460 |
|  | 3 | 500 |
|  | 7 | 530 |
|  | 14 | 520 |
| Rigid polyvinyl chloride sheet | Immediately after application | 330 |
|  | 1 | 430 |

TABLE 1-continued

| Substrate | Time (days) | Peeling strength (g/5 mm) |
|---|---|---|
| | 3 | 490 |
| | 7 | 530 |
| | 14 | 530 |
| Polymethyl methacrylate sheet | Immediately after application | 280 |
| | 1 | 370 |
| | 3 | 450 |
| | 7 | 480 |
| | 14 | 490 |
| Polystyrene sheet | Immediately after application | 290 |
| | 1 | 390 |
| | 3 | 450 |
| | 7 | 480 |
| | 14 | 490 |
| Urethane-coated ABS sheet | Immediately after application | 290 |
| | 1 | 380 |
| | 3 | 440 |
| | 7 | 490 |
| | 14 | 500 |

Observation of the peeling condition on the occasion of peeling strength measurement indicated that whereas, as a tendency, the attachment was by sticking during the period from immediately after application to one day after application, the subsequent attachment was virtually by adhesion.

Microscopic examination of stained section of the layer 2 after curing revealed that in the adhesive resin layer 22, the moisture-curing adhesive resin (y) was present continually from one surface to the other of the adhesive resin layer 22.

COMPARATIVE EXAMPLE

On the release sheet 1 was formed a layer consisting exclusively in the same pressure-responsive adhesive resin (x) as used in Example 1 and the main transfer layer 3 was then formed in the same manner as Example 1, followed by disposition of the protective layer 4. The peeling strengths obtainable by this procedure only ranged from 120 to 245 g/5 mm according to the kinds of substrate. Furthermore, air entrapment was invariably encountered and removal of entrapped air was difficult.

EXAMPLE 2

FIG. 2 is a schematic sectional view showing another example of the method for constructing a transfer sheet in accordance with the invention.

A non-adhesive resin layer 21 having a predetermined pattern and a delicate grating pattern was formed in the same manner as Example 1. Then, over this pattern of non-adhesive resin layer 21 formed above, the same composition as used in Example 1 was screen-printed in the same overall pattern as the non-adhesive resin layer 21. Otherwise, the procedure of Example 1 was repeated.

In this case, too, the results were as satisfactory as those obtained in Example 1.

EXAMPLES 3 AND 4

The procedure of Example 1 was repeated except that, in lieu of the composition of Example 1, the pressure-responsive adhesive resin (x) solution only (Example 3) or the moisture-curing adhesive resin (y) solution only (Example 4) was employed. However, in Example 4, a pressure was applied for some time after application. Satisfactory transfer sheets were obtained in these examples, too.

What is claimed is:

1. A transfer sheet comprising a release sheet, a sticker layer disposed on a releasable side of said release sheet, a main transfer layer superposed on said sticker layer, said sticker layer consisting of a non-adhesive resin layer in the form of a grating and an adhesive resin layer disposed in interstices of said grating, wherein said adhesive resin layer comprises a stick-adhesive composition layer consisting of a pressure-responsive adhesive resin and a moisture-curing adhesive resin in a ratio of 90:10 through 5:95 by weight on a nonvolatile matter basis.

2. A transfer sheet according to claim 1 wherein either said moisture-curing adhesive resin or said moisture-curing adhesive resin and said pressure-responsive adhesive resin are continually present from one surface to the other of said stick-adhesive resin composition.

3. A transfer sheet comprising a release sheet, a sticker layer disposed on a releasable side of said release sheet, a main transfer layer superposed on said sticker layer, said sticker layer consisting of a non-adhesive resin layer in the form of a grating and an adhesive resin layer disposed in interstices of said grating, said adhesive resin layer comprising a stick-adhesive composition layer consisting of a pressure-responsive adhesive resin and a moisture-curing adhesive resin in a ratio of 90:10 through 5:95 by weight on a nonvolatile matter basis, wherein said sticker layer is a pattern-printed layer, said main transfer layer is a pattern-printed layer formed on said sticker layer in the same pattern as that of said sticker layer, and a peelable protective sheet covering a broader area than the pattern of said main transfer layer is disposed over said main transfer layer.

4. A transfer sheet according to claim 3, wherein said main transfer layer is one or more than one layer formed by screen printing.

* * * * *